UNITED STATES PATENT OFFICE 2,409,829

ALKYLENE-BIS-UREAS

William Robert Boon, Blackley, Manchester, England, assignor to Imperial Chemical Industries Limited, a corporation of Great Britain No Drawing. Application April 4, 1944, Serial No. 529,525

6 Claims. (Cl. 260—553)

This application is a continuation-in-part of my copending applications Serial Nos. 425,006, filed December 30, 1941, and 505,037, filed October 5, 1943.

The present invention relates to new substituted ureas which are alkylene bis-ureas, and in particular are compounds of the general formula

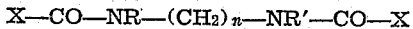

$$X-CO-NR-(CH_2)_n-NR'-CO-X$$

wherein X stands for the secondary amino group corresponding with an aliphatic or heterocyclic secondary amine X—H as more fully described below; wherein R and R' stand for alkyl groups, which are not necessarily alike, but which are such that they jointly contain not more than 8 carbon atoms; and wherein $n$ is any integer from 2 to 6 inclusive.

Amongst the properties of these new alkylene bis-ureas which make them useful are their physiological properties, as shown by their effect on the living organism, which are such that they may be used as stimulants of the respiratory and vasomotor centres, and for that purpose they are very valuable, as the ratio of active dose to toxic dose is very low.

According to the invention the said new alkylene bis-ureas are made either by causing to react together one molecular proportion of a dialkylalkylenediamine, R—NH—(CH₂)ₙ—NH—R' (where R, R' and $n$ have the significance given above) with two molecular proportions of a carbamyl chloride X—CO—Cl (where X has the significance given above), or by treating a dialkylalkylenediamine (R—NH—(CH₂)ₙ—NH—R' as before) with phosgene to give the corresponding bis-carbamyl chloride, and causing that to interact with two molecular proportions of an aliphatic or heterocyclic secondary amine of formula X—H as defined above.

In all the above cases, if the reaction is carried out in organic liquid medium and in the absence of extraneous acid absorbing agents, part of the amine (diamine or secondary amine, as the case may be) absorbs the liberated HCl and is thrown out of solution. Therefore, the molal proportions above indicated are the theoretical minima, and in actual practice an excess of the amine is preferably employed.

The secondary amine X—H above referred to may be a member of the group consisting of dialkyl amines, alkoxy-substituted dialkyl amines and heterocyclic compounds having an NH group in the ring. Typical representatives of this group are: dimethylamine, diethylamine, methyl ethylamine, di-n-propylamine, di-n-butylamine, methyl-n-propylamine, piperidine, morpholine, methyl methoxyethylamine, ethyl methoxyethylamine, ethyl ethoxyethylamine, di(methoxyethyl)amine and di(β-ethoxyethyl)amine. For the special physiological properties above referred to, it is preferable to limit the molecular weight of the chosen secondary amine X—H as follows: to 120 or less, if it is of a simple dialkylamine form or of a heterocyclic nature; to 160 or less, if it is an alkyl-alkoxyalkylamine; and to 220 or less, if it is of the di(alkoxyalkyl)amine form.

As typical dialkyl-alkylene-diamines of formula R—NH—(CH₂)ₙ—NH—R' above referred to, the following may be mentioned: N:N'-dimethylethylene diamine, N:N'-diethylethylene diamine, N:N'-dimethyltrimethylene diamine, N-methyl-N'-ethylethylene diamine, N:N'-di-n-propylethylene diamine, N:N'-di-n-butylethylene diamine, N:N'-dimethyltetramethylene diamine, N:N'-dimethylhexamethylene diamine, N:N'-dimethyl-1:2-propylene diamine, N:N'-dimethyl-1:3-butylene diamine.

The invention is illustrated but not limited by the following examples in which the parts are by weight.

Example 1

88 parts of diethylcarbamyl chloride dissolved in 120 parts of benzene are added with stirring to a solution of 53 parts of N:N'-dimethyltrimethylenediamine (obtainable from N:N'-dimethyl-N:N'-diphenyl-trimethylenediamine by the method described—in respect of N:N'-dimethylethylenediamine — in Berichte der deutschen chemischen Gesellschaft 1918, vol. 51, p. 738) in 450 parts of benzene. When the reaction is complete the N:N'-dimethyltrimethylenediamine dihydrochloride (which has M. P. 266° C.) is removed by filtration, and the filtrate is shaken with 100 parts of saturated potassium carbonate, dried over anhydrous potassium carbonate and distilled whereby there is obtained 67 parts of N:N'-dimethyltrimethylenediamine-N:N'-dicarboxylic acid bis-diethylamide as a colourless liquid, B. P. 238° C. at 33 mm. pressure which is miscible in all proportions with water and the commoner organic solvents.

In a similar manner there are obtained the following:

(a) N:N'-dimethylethylenediamine - N:N'-dicarboxylic bis-piperidide (M. P. 90° C.).

(b) N-methyl-N'-ethylethylenediamine-N:N'-dicarboxylic bis-dimethylamide (B. P. 205° C., at 22 mms. pressure).

(c) N:N'-diethylethylenediamine-N:N'-dicarboxylic bis-morpholide (M. P. 98° C.), which is a colourless crystalline solid readily soluble in water, ethanol and benzene and sparingly soluble in light petroleum. The morpholine-N-carboxylic chloride used in making this substance has B. P. 137–138° C. at 33 mms. pressure and is obtained by the action of phosgene on morpholine in accordance with the method described in respect of diethylamine in Bulletin de la Société chimique de Paris, 1904, 3rd series, vol. 31, p. 689.

(d) N:N'-di-n-propylethylenediamine - N:N'-dicarboxylic bis-dimethylamide (B. P. 208° C. at 18 mm. pressure). The N:N'-di-n-propylethylenediamine (B. P. 189° C. dihydrochloride M. P. 300° C.) required is made by reacting di-p-toluene-sulphonylethylenediamine with n-propyl bromide by the method of Berichte, 1895, vol. 28, p. 3074, to give di-p-toluene-sulphonyl-di-n-propylethylenediamine of M. P. 122° C. which is then hydrolysed by heating with 80% sulphuric acid at 150° C. for 5 hours.

(e) N:N'-di-n-butylethylenediamine-N:N'-dicarboxylic bis-morpholide (B. P. 229° C. at 0.4 mm. pressure, M. P. 41–42° C.). The N:N'-di-n-butylethylenediamine required has B. P. 226° C., its dihydrochloride melts at 300° C. with decomposition and its di-p-toluenesulphonyl derivative at 119° C. It is made in a manner analogous to that used for making N:N'-di-n-propylethylenediamine.

(f) N:N' - dimethyltetramethylenediamine-N:N'-dicarboxylic bis-diethylamide (B. P. 216° C. at 10 mm. pressure). The N:N'-dimethyltetramethylenediamine (B. P. 164° C., dihydrochloride M. P. 275° C.) required is made by condensing 1:4-dibromobutane with sodium-p-toluenesulphonylmethylamide in xylene at 140° C. to give di-p-toluenesulphonyl-N:N'-dimethyltetramethylenediamine of M. P. 129° C. which is hydrolysed in the usual manner.

(g) N:N' - dimethylhexamethylenediamine-N:N'-dicarboxylic bis-dimethylamide (B. P. 238° C. at 17 mm. pressure).

Example 2

21 parts of N:N'-dimethylethylenediamine carbonate is suspended in 250 parts of dry chloroform and the solution is saturated with phosgene at room temperature. After it has stood for 15 hours air is blown through the mixture to remove the excess of phosgene. The mixture is then filtered to remove N:N'-dimethylethylenediamine dihydrochloride and from the filtrate the chloroform is distilled, leaving a pale yellow, mobile somewhat lachrymatory liquid which is the bis-carbamyl chloride. This is dissolved in 100 parts of ether. 20 parts of diethylamine are added. After the reaction is complete the whole is agitated with 150 parts of saturated aqueous sodium carbonate solution, the ethereal layer is separated and dried over anhydrous potassium carbonate. This dry ethereal solution is fractionally distilled to give as one fraction N:N'-dimethylethylenediamide-N:N'-dicarboxylic bis-diethylamide as a colourless liquid, B. P. 339° C. at atmospheric pressure or 224° C. at 13 mm. pressure which is miscible in all proportions with water and the commoner organic solvents.

Example 3

16 parts of N:N'-dimethylethylenediamine dihydrochloride are dissolved in 150 parts of water, and sufficient 32% aqueous caustic soda is then added to make the solution alkaline to phenolphthalein and the whole is cooled to 5° C. 25 parts of dimethylcarbamyl chloride are now added with stirring and cooling at such a rate that the temperature does not exceed 20° C., more caustic soda being added as required to keep the solution just alkaline to phenolphthalein. After stirring for 6 hours sufficient solid potassium carbonate is added to saturate the solution and the oil which separates out is dissolved up in 100 parts of benzene. The benzene solution is dried over anhydrous potassium carbonate and the benzene is then distilled off. N:N'-dimethylethylenediamine-N:N'-dicarboxylic bis-dimethylamide (B. P. 193° C. at 20 mm. pressure) is thus obtained. It is a colourless oil which gradually solidifies to a crystalline mass; it is miscible in all proportions with water and the commoner organic solvents.

Example 4

20 parts of N:N'-dimethyltrimethylenediamine are gradually added with stirring to a cooled solution of 150 parts of phosgene in 500 parts of toluene, the temperature being kept below −10° C. After the addition is complete air is blown through the reaction mixture to remove the excess of phosgene and the mixture is filtered to remove N:N'-dimethyltrimethylenediamine dihydrochloride. 34 parts of piperidine are added and after standing one hour the mixture is filtered to remove piperidine hydrochloride. The toluene is then distilled off whereby N:N'-dimethyltrimethylenediamine - N:N' - dicarboxylic bis-piperidide is obtained. It is a colourless oil B. P. 205° C. at 0.75 mm. pressure which is readily soluble in ethanol and benzene and only slightly soluble in water.

In a similar manner there can be obtained N:N'-dimethyltrimethylenediamine - N:N'-dicarboxylic bis-(methyl-n-propylamide) and N:N'-dimethyltrimethylenediamine - N:N' - dicarboxylic bis-(ethyl-β-ethoxyethylamide).

Example 5

175 parts of N:N'-dimethyltrimethylenediamine dissolved in 500 parts of toluene are added, at −15° C., with stirring, to a solution of 280 parts of phosgene in 1000 parts of toluene. After the addition is complete, air is blown through the reaction mixture to remove the excess of phosgene; N:N'-dimethyltrimethylenediamine dihydrochloride separates out and is filtered off and washed with dry toluene. The united filtrate and washings are then distilled whereby there is obtained N:N'-dimethyltrimethylenediamine-N:N'-dicarboxylic dichloride of B. P. 163–166° C. at 0.8 mm. pressure, together with some 1:3-dimethyl-2-ketohexahydropyrimidine B. P. 140° C. at 44 mm. pressure.

To a solution of 11 parts of N:N'-dimethyltrimethylenediamine-N:N'-dicarboxylic dichloride in 50 parts of benzene there is added a solution of 18 parts of methyl methoxyethylamine in 50 parts of benzene. Methyl methoxyethylamine hydrochloride separates out and is filtered off and the filtrate is distilled whereby there is obtained N:N' - dimethyltrimethylenediamine - N:N' - dicarboxylic acid bis(methylmethoxyethylamide) of B. P. 253° C. at 16 mm. pressure.

In a similar manner there are obtained:

(a) N:N'-diethylethylenediamine-N:N'-dicarboxylic acid bis(ethyl methoxyethylamide) B. P. 239° C. at 17 mm. pressure.

(b) N:N'-di - n - propylethylenediamine-N:N'-dicarboxylic acid bis(methyl ethoxyethylamide) of B. P. 255° C. at 20 mm. pressure.

(c) N:N'-dimethyltrimethylenediamine-N:N'-dicarboxylic acid bis(ethyl ethoxyethylamide) of B. P. 253° C./14 mm.

*Example 6*

17 parts of ethyl methoxyethyl-carbamyl chloride (made from ethyl methoxyethylamine and phosgene) dissolved in 50 parts of benzene are added with stirring to a solution of 14 parts of N:N'-di-n-propyl ethylenediamine in 50 parts of benzene. N:N'-di-n-propylethylenediamine dihydrochloride separates out and is filtered off. The filtrate is shaken with 50 parts of a saturated aqueous solution of potassium carbonate, dried over anhydrous potassium carbonate and distilled whereby there is obtained N:N'-di-n-propylethylenediamine-N:N'-dicarboxylic bis(ethyl methoxyethylamide) of B. P. 265° C. at 25 mm. pressure.

*Example 7*

29 parts of di-(β-ethoxyethyl) carbamyl chloride (of B. P. 165° C. at 19 mm. pressure) dissolved in 75 parts of toluene are added with stirring to 17 parts of N:N'-di-n-butylethylenediamine in 50 parts of toluene and the whole is refluxed gently for 6 hours. After cooling, the precipitated amine hydrochloride is removed by filtration, the filtrate refluxed for ½ hour with 10 parts of water and distilled to dryness on the water bath under reduced pressure. The residue is extracted with hot 60°–80° petroleum ether and the extract fractionally distilled under reduced pressure whereby N:N'-di-n-butylethylenediamine - N:N' - dicarboxylic-bis-di(β-ethoxyethyl) amide distils over above 240° C. at 10 mm. pressure.

The di-(β-ethoxyethyl)-carbamyl chloride used as starting material is made from phosgene and di-β-ethoxyethylamine, which itself is obtained by interaction of β-ethoxyethyl chloride with an excess of aqueous β-ethoxyethylamine, or, less advantageously, by condensing aniline with ethylene chlorhydrin to give di-(β-hydroxy-ethyl)-aniline, converting this to its sodium salt and reacting with diethyl sulphate to give di-(β-ethoxyethyl)-aniline which is then converted into di-(β-ethoxyethyl)amine by the method described in respect of N:N'-dimethylethylenediamine, in Berichte der deutschen Chemischen Gesellschaft, 1918, vol. 51, p. 738.

Whereas the above examples illustrate some embodiments of the invention, it will be obvious to one skilled in the art that many other embodiments and variations can be devised without departing from the spirit and scope thereof and it is therefore to be understood that the invention is not limited to the particular embodiments described above, but only as defined in the following claims.

In the claims below, the expression "unsubstituted heterocyclic compounds" shall be understood as referring to heterocyclic compounds whose hydrogen atoms have not been replaced by other atoms or radicals.

I claim:

1. Alkylene bis-ureas having the structural formula:

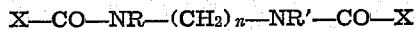

wherein $n$ is any integer from 2 to 6 inclusive, R and R' represent alkyl groups containing together not more than 8 carbon atoms and X represents the imino radical of a secondary amine being a member of the group consisting of dialkyl amines, alkoxy-substituted dialkyl amines, and unsubstituted heterocyclic compounds having an NH group in the ring.

2. Alkylene bis-ureas having the structural formula:

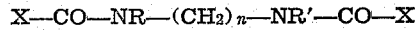

wherein $n$ is any integer from 2 to 6 inclusive, R and R' represent alkyl groups containing together not more than 8 carbon atoms and X represents the imino radical of a dialkyl amine having a molecular weight not exceeding 120.

3. Alkylene bis-ureas having the structural formula:

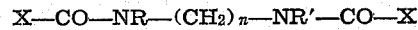

wherein $n$ is any integer from 2 to 6 inclusive, R and R' represent alkyl groups containing together not more than 8 carbon atoms, and X represents the imino radical of an unsubstituted heterocyclic compound having an NH group in the ring and having a molecular weight not exceeding 120.

4. N:N'-dimethyl-trimethylene-diamine-N:N'-dicarboxylic-bis-diethylamide.

5. N:N'-di-n-propyl-ethylene-diamine - N:N'-dicarboxylic-bis-dimethylamide.

6. N:N'-di-n-butyl-ethylene-diamine-N:N'-dicarboxylic-bis-morpholide.

WILLIAM ROBERT BOON.